United States Patent [19]

Mimura

[11] Patent Number: 4,854,920

[45] Date of Patent: Aug. 8, 1989

[54] CONTROL DEVICE OF NON-STAGE TRANSMISSION

[75] Inventor: Munehiko Mimura, Himeji, Japan

[73] Assignee: Mitsubishi Denki Kabushiki Kaisha, Tokyo, Japan

[21] Appl. No.: 205,392

[22] PCT Filed: Aug. 26, 1987

[86] PCT No.: PCT/JP87/00631

§ 371 Date: Jun. 20, 1988

§ 102(e) Date: Jun. 20, 1988

[30] Foreign Application Priority Data

Aug. 26, 1986 [JP] Japan .................. 61-200562

[51] Int. Cl.⁴ .............................................. F16H 11/04
[52] U.S. Cl. ........................................ 474/28; 74/866; 74/868
[58] Field of Search ................... 474/11, 12, 17, 18, 474/28, 69, 70; 74/865–869

[56] References Cited

U.S. PATENT DOCUMENTS

| | | | |
|---|---|---|---|
| 4,610,183 | 9/1986 | Nobumoto et al. | 474/28 X |
| 4,663,991 | 5/1987 | Nakamura et al. | 474/28 X |
| 4,672,864 | 6/1987 | Morimoto | 474/28 X |
| 4,715,467 | 12/1987 | Sakai | 74/866 X |
| 4,747,807 | 5/1988 | Nakamura et al. | 74/868 X |

FOREIGN PATENT DOCUMENTS 132430 6/1986 Japan .

Primary Examiner—Thuy M. Bui
Attorney, Agent, or Firm—Sughrue, Mion, Zinn, Macpeak, and Seas

[57] ABSTRACT

A control device of non-stage transmission for vehicles comprising a V-belt and pulleys, and which serves as an electronic control unit by receiving engine control information and drive control information to gnerate a duty control signal according to a referece pressure of hydraulic control of the non-stage transmission, and electrically controlling transmission gear ratio in a form of electronic control device, whereby accuracy and life of the control device as well as fuel consumption and driving performance of vehicle is improved.

2 Claims, 4 Drawing Sheets

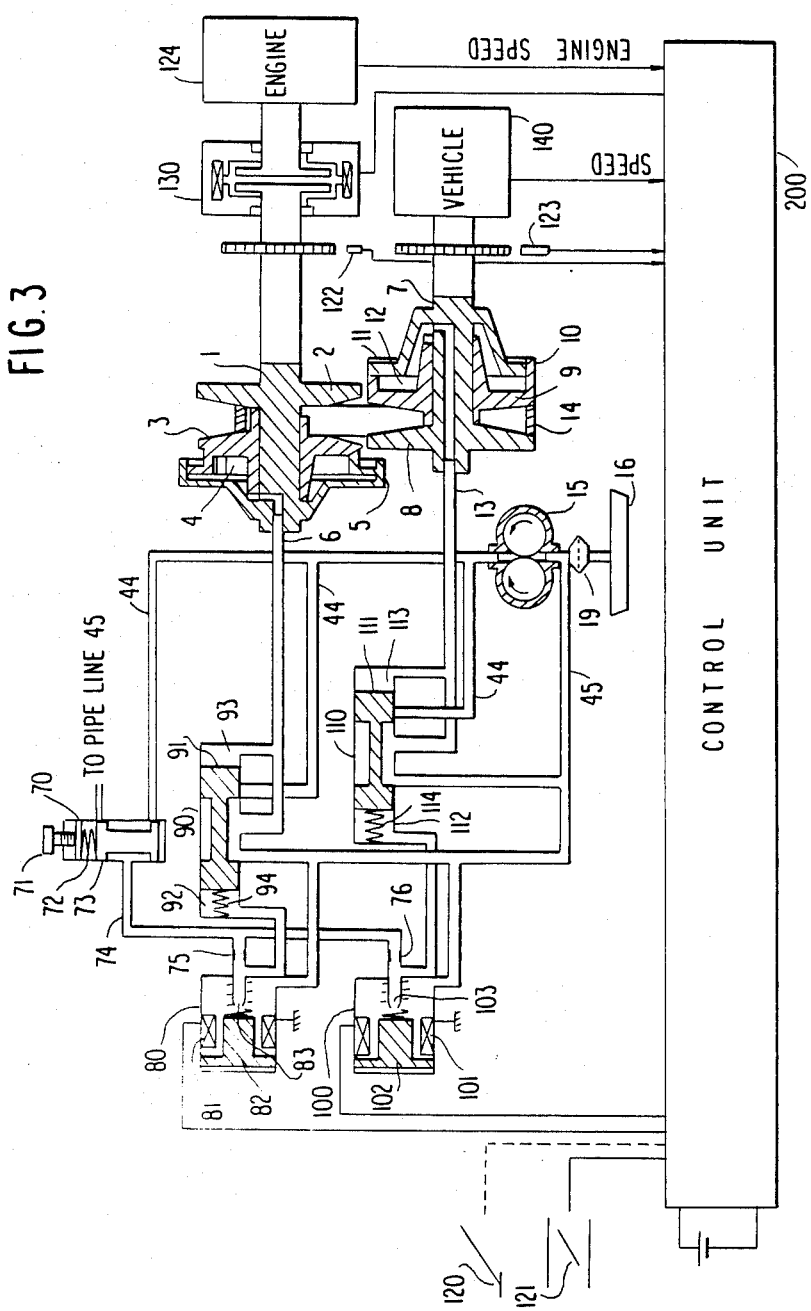

CONTROL DEVICE OF NON-STAGE TRANSMISSION

FIELD OF THE INVENTION

The present invention relates to a control device of a non-stage transmission for vehicles comprising a V belt and pulleys.

BACKGROUND ART

FIG. 1 illustrates a known control device of a non-stage transmission according to a prior art. This known control device was disclosed in Japanese Laid-Open Patent Publication (unexamined) No. 55-65755.

In FIG. 1, numeral 1 indicates an input shaft; numerals 2, 3 indicate pulleys of the input shaft (primary pulleys); numeral 5 indicates a cylinder having a cylinder chamber 4; numeral 6 indicates a pipe line; numeral 7 indicates an output shaft; numerals 8, 9 indicate pulleys of the output shaft (secondary pulleys); 10 indicates a cylinder; 11 indicates a piston; 12 indicates a cylinder chamber; 13 indicates a pipe line; 14 indicates a belt; 15 indicates a pump serving as a hydraulic power source; 16 indicates a tank; 17 indicates a transmission gear ratio detecting shaft; 18 indicates a sensor shoe; 19 indicates a filter; 20 indicates a transmission control valve; 21 indicates a pilot sleeve, 22 indicates a pitot pressure space; 23 indicates an annular groove; 24 indicates an opening; 25 indicates a Pitot tube; 26 indicates a pipe line; 27 indicates a spring; 28 indicates an actuating member; 29 indicates a spring; 31 indicates a throttle cam; 32 indicates a pivot; and 33 indicates a cam follower. Numeral 40 indicates a secondary hydraulic control valve; 41, 42 indicates sleeves; 43 indicates a space; 44, 45 indicate pipe lines; 46 indicates a pitot pressure space; 47 indicates a spring; 50 indicates a pivot; 51 indicates a lever; 61 indicates a pivot; and 62 indicates a turning member.

In the conventional control device of above construction, the primary oil pressure is controlled in accordance with a required transmission pattern from the throttle cam 31 and an engine speed given from the Pitot tube 25 by way of the input shaft 1. On the other hand, the secondary cylinder oil pressure is controlled by detecting a transmission gear ratio by the transmission gear ratio detecting shaft 17, and the secondary oil pressure is reduced with the transmission gear ratio. Then, the pilot sleeve 21 moves to change pipe line according to the primary and secondary oil pressures, whereby the input shaft pulley 3 and the output shaft pulley 9 move to change the transmission gear ratio to non-stage.

FIG. 2 (a) is a diagram illustrating a relation between cylinder pressure, i.e., engine speed ne and the primary cylinder pressure $P_1$ and secondary cylinder pressure $P_2$. FIG. 2 (b) is a diagram illustrating a relation between transmission characteristic, i.e., engine speed deviation $\Delta ne$ and transmission gear ratio R. FIG. 2 (c) is a diagram illustrating a relation between engine characteristic, i.e., engine speed ne and engine torque $\tau e$.

In the above conventional device, however, it was not easy to achieve such a driving performance as allowing improvement in fuel combustion and feeling in accordance with the transmission pattern supplied from the throttle cam 31. Change of driving performance according to type of vehicle was not easy, either. It was impossible to accurately detect engine speed because the Pitot tube 25, serving as an engine speed detector, was mechanically arranged. Accuracy of the transmission gear ratio detecting mechanism was not achieved due to life or secular change. It was impossible to separately control each cylinder oil pressure $P_1$, $P_2$. It was also impossible to control the cylinder oil pressures $P_1$, $P_2$ according to the intensity of engine torque.

The present invention was made to solve the above problems and has an object of providing a control device of a non-stage transmission in which driving performance can be improved without deviation due to life or secular change, and the primary and secondary cylinder oil pressures can be separately controlled.

DISCLOSURE OF THE INVENTION

The control device of a non-stage transmission according to the present invention comprises an electronic control device which receives engine control information and drive control information and generates duty control information, reference pressure generating means which receives the duty control information and generates a reference pressure for hydraulic control of cylinders of the transmission, and hydraulic control means which carries out hydraulic control of the cylinders in accordance with the reference pressure and a feedback pressure from the cylinders.

BRIEF DESCRIPTION OF THE DRAWINGS

FIG. 3 is a schematic view illustrating the control device of a non-stage transmission according to the present invention;

BEST MODE OF CARRYING OUT THE INVENTION

Figure 1:
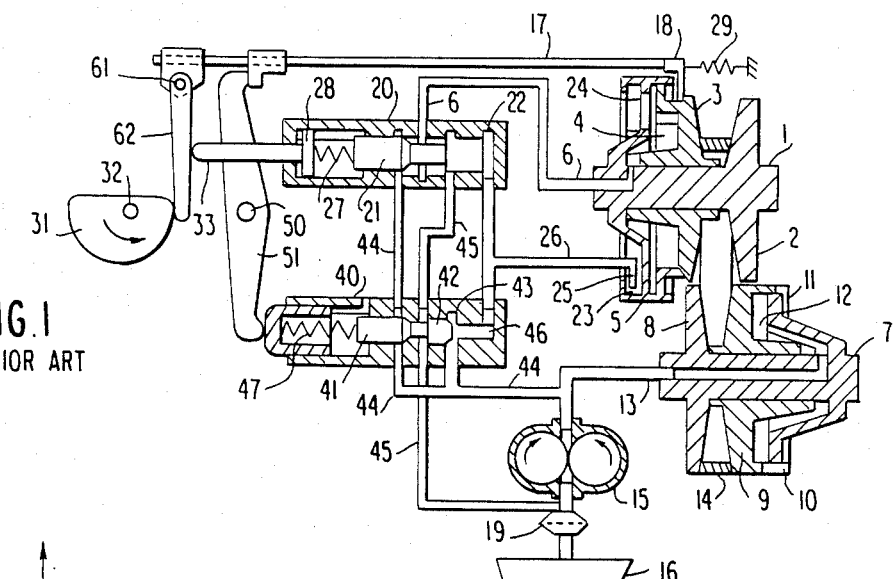
FIG. 1 is a schematic view illustrating a construction of the control device of a non-stage transmission according to the prior art.
Figure 2A:
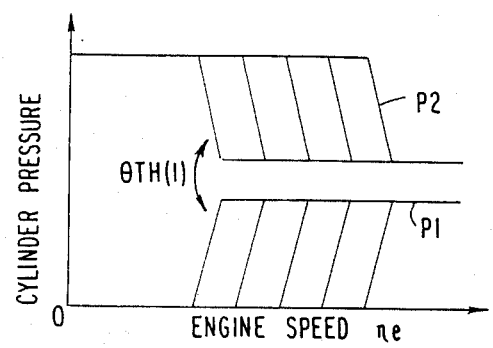
FIG. 2 (a) to (c) are characteristic diagrams of the device according to the prior art.
Figure 2B:
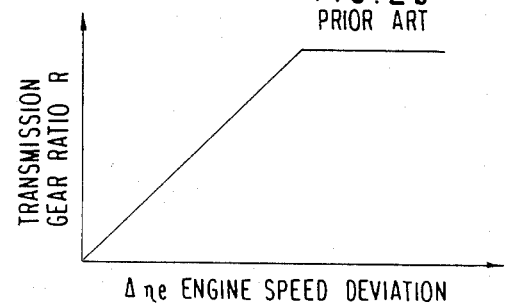
Figure 2C:
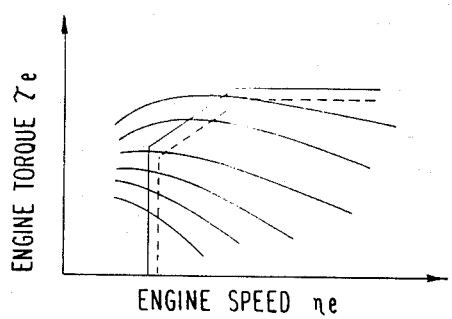

Referring now to the accompanying drawings, the present invention is hereinafter described in detail. FIG. 3 is a schematic view illustrating the control device of a non-stage transmission according to the present invention, while FIG. 4 is a schematic diagram of the electronic control unit used in the control device of a non-stage transmission according to the invention.

In FIG. 3, numeral 70 indicates a pressureregulating valve comprising a screw 71, spring 72 and sleeve 73; numeral 74 indicates a pipe line; numerals 75, 76 indicate orifices; numeral 80 indicates a primary duty valve comprising a coil 81, a sleeve 82 and a nozzle 83; numeral 90 indicates a primary pressure control valve comprising a sleeve 91, a reference pressure space 92, a feedback pressure space 93 and a spring 94; numeral 100 indicates a secondary duty valve comprising a coil 101, a sleeve 102 and a nozzle 103; numeral 110 indicates a secondary pressure control valve comprising a sleeve 111, a reference pressure space 112, a feedback pressure space 113 and a spring 114; numeral 120 indicates an accelerator opening sensor; numeral 121 indicates a throttle opening sensor; numeral 122 indicates an input shaft sensor; numeral 123 indicates an output shaft sensor; numeral 130 indicates a powder clutch; numeral 140 indicates a vehicle; and numeral 200 indicates an electronic control unit.

Figure 4:
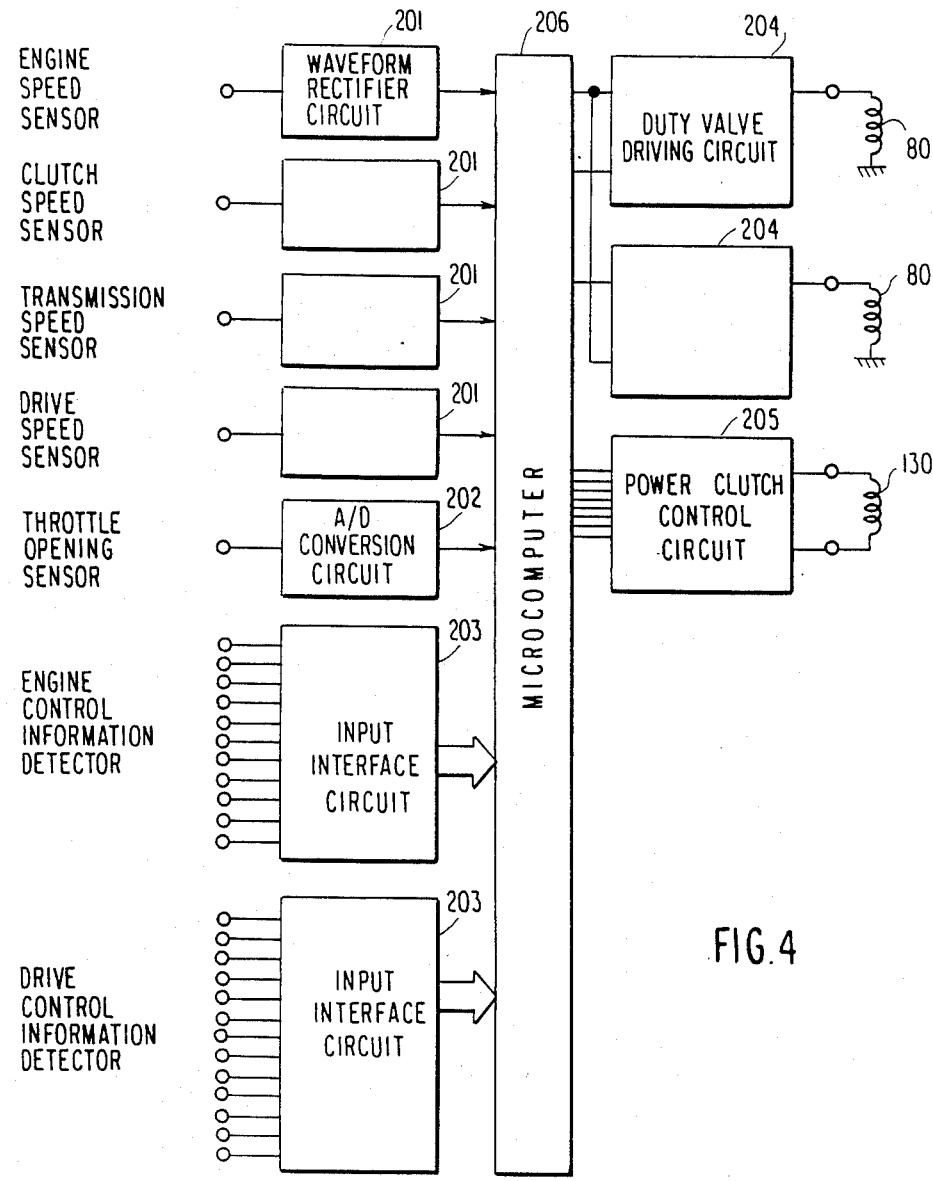
FIG. 4 is a schematic diagram of the electronic control unit used in the control device of a non-stage transmission according to the invention.

In FIG. 4 illustrating a schematic view of the electronic control unit 200, numeral 201 indicates a waveform rectifier circuit; numeral 202 indicates an A/D conversion circuit; numeral 203 indicates an input interface circuit; numeral 204 indicates a duty valve driving circuit; numeral 205 indicates a powder clutch control circuit; and numeral 206 indicates a microcomputer.

Figure 5A:
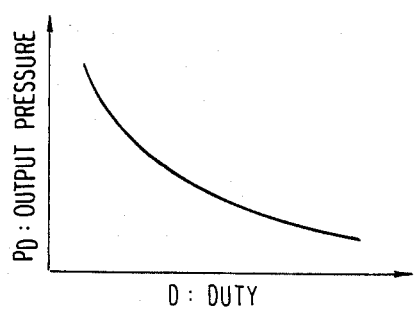
FIG. 5 (a), (b) are respectively characteristic diagrams of the control device of a non-stage transmission according to the invention.
Figure 5B:
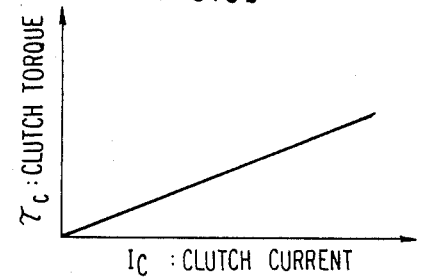
Figure 6A:
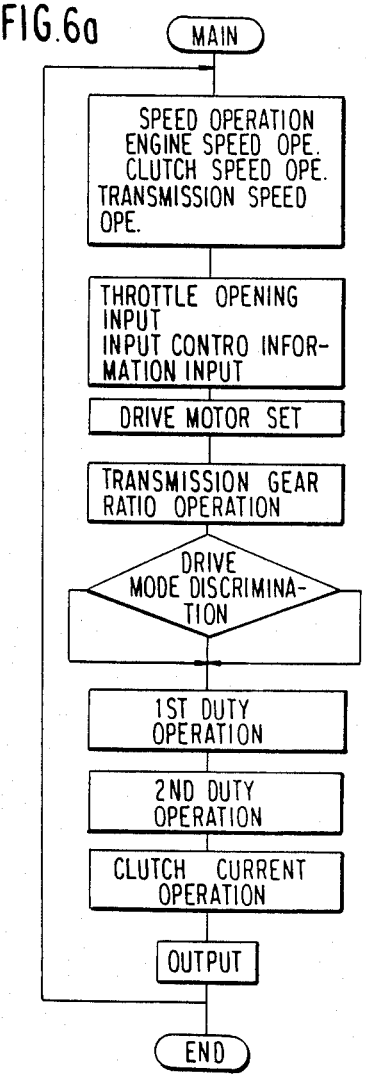
FIG. 6 (a) to (d) are flowcharts of the electronic control unit illustrated in FIG. 4.
Figure 6B:
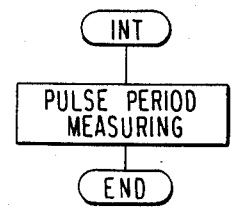
Figure 6C:
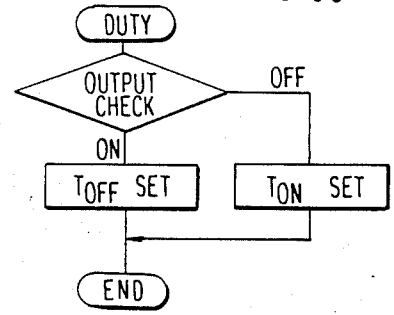
Figure 6D:
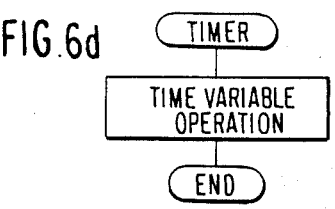

FIG. 5 (a) is a diagram showing a relation between a duty D and an output pressure PD, and FIG. 5 (b) is a diagram showing a relation between a clutch current Ic and a clutch torque c.

FIG. 6 is a flowchart of the microcomputer 206, in which Figure (a) shows a main loop, FIG. 6 (b) shows an interruption program for measuring period with interruption pulse from the sensor, FIG. 6 (c) shows an interruption program for duty control which is generated every inversion of duty signal in order to generte a duty control signal, and FIG. 6 (d) shows an interruption program for time control which carries out processing of time variable parameter at a certain interval.

In the control valve of above arrangement, the duty valves 80, 100 generate reference pressures, each for the control valve 90 and the control valve 110, in accordance with a duty signal (pulse width modulation signal) from the control unit 200. More specifically, when turned ON, the hydraulic circuit is closed, and oil pressure of the pipe line 74 becomes equal to oil pressures (output oil pressures) of the reference pressure spaces 92, 112. On the other hand, when turned OFF, the hydraulic circuit is open, and the output oil pressures are reduced. The control valves 90, 110 operate to keep the output pressures constant since oil pressures of the cylinder chambers 4, 12 are also fed back to the feedback pressure spaces 93, 113. That is to say, the sleeves 91, 111 move according to the reference pressure and feedback pressure, whereby oil pressures of the pipe lines 6, 13 are changeably communicated with the pipe lines 44, 45 resulting in changeable communication with high pressure side and low pressure side of the pump 15. Accordingly, the oil pressures of the cylinder chambers 4, 12 can be controlled in accordance with the duty signal from the control unit 200.

The pressure-regulating valve 70 serves as a valve for protection from pressure increase by completely closing the hydraulic circuit. Control of transmission gear ratio is carried out by complementarily varying (increasing or decreasing) the oil pressures of the cylinder chambers 4, 12. More specifically, because length of the belt 14 is fixed, when increasing the oil pressure of the cylinder chamber 4 in relation to the oil pressure of the cylinder chamber 12, the pulley 3 moves rightward to increase the tension diameter of the belt 14 wound round the pulleys 2, 3 while decreasing the tension diameter of the belt 14 wound round the pulleys 8, 9, whereby transmission gear ratio is reduced. On the other hand, the transmission gear ratio is increased when relatively reducing the oil pressure of the pressure chamber 4. Establishing that a rotaional frequency of the input shaft 1 connected to the engine 124 through the powder clutch 130 is NE, a rotational frequency of the output shaft 7 connected to the vehicle 140 is NO, an equivalent radius of the input shaft 1 is RE and an equivalent radius of the output shaft 7 is RO, the transmission gear ratio can be expressed by $$\frac{NO}{NE} = \frac{RE}{RO}.$$

The transmission gear ratio is decided in accordance with fuel consumption, driving feeling, driving performance, etc. Accordingly, the control unit 200 controls the duty valves 80, 100 by generating a duty signal according to engine speed, vehicle speed, throttle opening (drivers's need), etc., thereby the transmission gear ratio being controlled. In addition, the control unit 200 carries out torque control of the powder clutch 130.

As has been described so far, since control of transmission gear ratio is electrically carried out by the electronic control unit, the control according to the invention is more advantageous than mechanical control not only in view of life and secular change but also in view of performance such as fuel consumption, driving performance, etc. Cylinder oil pressure of the transmission can be controlled separately dividing into primary and secondary pressures according to engine control information and driving control information, which also results in improvement of control accuracy. Furthermore, a compact and small-sized electronic control unit is achieved since the hydraulic control means of output oil pressure feedback type is incorporated. The electronic control unit also performs torque control for the powder clutch, whereby control signals of the powder clutch and the non-stage transmission can be generated from a common input signal, being able to be synchronized by computer. As the result, time control between the non-stage transmission and the powder clutch can be easily carried out.

I claim:

1. A control device of a stepless transmission, comprising:
    a stepless transmission comprising a primary and a secondary pulley having an endless belt circumscribed therearound, each of said pulleys having two flanges defining a V-shaped groove therebetween and cylinder disposed adjacent one of said flanges, said one flange being axially adjustable by applying hydraulic pressure to said cylinder such that the groove width and attendantly the effective diameter of each of said pulleys is variable;
    an electronic control device which receives information and generates duty control information;
    a pair of duty valves for independently generating respective reference pressures in response to the duty control information;
    a pair of pressure control valves comprising a cylindrical sleeve and a spool slidably disposed therein so as to define a reference pressure space communicating with an associated duty valve and a feedback pressure space communicating with an associated cylinder, said spaces being disposed on opposite ends of said spool, said spool having a control chamber intermediate of said reference pressure space and said feedback pressure space, said chamber communicating with said feedback pressure space and a high pressure line wherein axial movement of said spool causes said high pressure line to communicate with said feedback pressure space.

2. A control device of non-stage transmission according to claim 1, wherein said electronic control unit has control means of torque of a powder clutch provided between the non-stage transmission and an engine.

* * * * *